(12) United States Patent
Bowyer et al.

(10) Patent No.: US 9,217,415 B2
(45) Date of Patent: Dec. 22, 2015

(54) ESTIMATION OF WIND PROPERTIES USING A LIGHT DETECTION AND RANGING DEVICE

(75) Inventors: Robert Bowyer, Fulham (GB); Chris Spruce, Leatherhead (GB); Martin Evans, London (GB); Christopher Palmer, Wimbledon (GB); Nicholas Hucker, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 762 days.

(21) Appl. No.: 13/274,095

(22) Filed: Oct. 14, 2011

(65) Prior Publication Data
US 2013/0094960 A1  Apr. 18, 2013

(51) Int. Cl.
*F03D 7/04* (2006.01)
*F03D 11/00* (2006.01)

(52) U.S. Cl.
CPC ............ *F03D 7/042* (2013.01); *F03D 11/0091* (2013.01); *F05B 2270/8042* (2013.01); *Y02E 10/722* (2013.01); *Y02E 10/723* (2013.01)

(58) Field of Classification Search
CPC ................. F03D 11/0091; F03D 7/042; F05B 2270/8042; Y02E 10/722; Y02E 10/723
USPC ........... 416/1, 9, 37, 40, 44, 61; 700/286–290
See application file for complete search history.

(56) References Cited

U.S. PATENT DOCUMENTS

| | | | |
|---|---|---|---|
| 4,182,570 A * | 1/1980 | Courrier et al. ................. | 356/28 |
| 6,320,272 B1 * | 11/2001 | Lading et al. .................... | 290/44 |
| 6,542,226 B1 * | 4/2003 | Wernet ......................... | 356/28.5 |
| 6,946,751 B2 * | 9/2005 | Yoshida et al. ................. | 290/44 |
| 7,342,323 B2 * | 3/2008 | Avagliano et al. .............. | 290/55 |
| 8,239,071 B2 * | 8/2012 | Lausen ......................... | 700/287 |
| 8,928,164 B2 * | 1/2015 | Bowyer et al. .................. | 290/44 |
| 2005/0131620 A1 * | 6/2005 | Bowyer ........................ | 701/108 |
| 2006/0132994 A1 * | 6/2006 | Delmerico et al. ............. | 361/20 |
| 2006/0140764 A1 * | 6/2006 | Smith et al. ................... | 416/103 |
| 2007/0171396 A1 * | 7/2007 | Harris et al. .................... | 356/28 |
| 2007/0299548 A1 * | 12/2007 | Weitkamp ...................... | 700/52 |
| 2008/0078228 A1 * | 4/2008 | Nies ............................... | 73/1.01 |
| 2009/0047116 A1 * | 2/2009 | Barbu et al. ....................... | 415/1 |

(Continued)

FOREIGN PATENT DOCUMENTS

| | | | |
|---|---|---|---|
| GB | 2476506 A | * | 6/2011 |
| WO | 9842980 A1 | | 10/1998 |
| WO | 2009134221 A1 | | 11/2009 |

OTHER PUBLICATIONS

European Search Report EP 2 581 761 A1 dated Apr. 17, 2013 for corresponding EP Application No. 12 188 543.8, filed Oct. 15, 2012.

(Continued)

*Primary Examiner* — Dwayne J White
*Assistant Examiner* — Wayne A Lambert
(74) *Attorney, Agent, or Firm* — Patterson & Sheridan, LLP

(57) ABSTRACT

Embodiments of the invention provide methods, systems, and apparatus for determining a property of wind approaching a wind turbine. A light detection and ranging equipment may emit pulsed radiation into oncoming wind to detect properties of the wind at a plurality of predefined locations. A property of the wind approaching the wind turbine may be determined based on the property of wind measured at at least two predefined locations.

17 Claims, 4 Drawing Sheets

(56) References Cited

U.S. PATENT DOCUMENTS

| | | | |
|---|---|---|---|
| 2009/0099702 A1* | 4/2009 | Vyas et al. | 700/287 |
| 2010/0054939 A1* | 3/2010 | Hoffmann | 416/10 |
| 2010/0078940 A1* | 4/2010 | Kondo et al. | 290/44 |
| 2010/0135789 A1* | 6/2010 | Zheng et al. | 416/1 |
| 2011/0044811 A1* | 2/2011 | Bertolotti | 416/1 |
| 2011/0106324 A1* | 5/2011 | Tsadka et al. | 700/287 |
| 2012/0029843 A1* | 2/2012 | Byreddy et al. | 702/42 |
| 2012/0045330 A1* | 2/2012 | Wu et al. | 416/1 |
| 2013/0106107 A1* | 5/2013 | Spruce et al. | 290/44 |

OTHER PUBLICATIONS

European Search Report EP 2 581 762 A1 dated Apr. 17, 2013 for corresponding EP Application No. 12 188 552.9, filed Oct. 15, 2012.

* cited by examiner

ESTIMATION OF WIND PROPERTIES USING A LIGHT DETECTION AND RANGING DEVICE

FIELD OF THE INVENTION

Embodiments of the invention generally relate to the advance detection of wind speed and direction upstream of a Wind Turbine Generator (WTG), specifically methods and systems for processing wind signals for use in the WTG's controller.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines generators may be arranged together in a wind park or wind power plant to generate sufficient energy to support a grid.

In modern high performance wind turbines, it is becoming increasingly important to control the aerodynamic forces in conjunction with the aero-elastic response through active manipulation. Such control may be accomplished not only by aerodynamic means, but also by, for example, controlling the pitch of the blade or the rotational speed of the wind turbine rotor.

Most modern wind turbines are equipped with a wind sensor or sensors on the nacelle capable of detecting the wind speed and direction. Based on the detected wind speed and direction one or more control decisions such as pitching blades, yawing the turbine upwind, etc., may be taken to ensure generation of a desired amount of power, reduction of loads and stresses on wind turbine components, and the like.

SUMMARY OF THE INVENTION

Embodiments of the invention generally relate to the advance detection of wind speed and direction upstream of a Wind Turbine Generator (WTG), specifically methods and systems for processing wind signals for use in the WTG's controller. Examples of sensors that could be used for measuring the wind speed and direction in advance of the rotor are Radar, Light Detection And Ranging (LIDAR), SODAR and Laser Doppler Velocimeter.

One embodiment of the invention provides a method for determining a property of wind approaching a wind turbine. The method generally comprises detecting radiation reflected from a plurality of distinct positions, determining a property of wind at each position based on the detected radiation, determining the property of the wind approaching the wind turbine based on the determined property of wind at a minimum of two distinct positions, and transferring the determined property of wind approaching the wind turbine to a controller of the wind turbine.

Another embodiment of the invention provides a device, generally configured to detect radiation reflected from a plurality of predefined positions, determine a property of wind at each position based on the detected radiation, determine a property of wind approaching the wind turbine based on the determined property of wind of at least two positions, and transfer the determined property of wind approaching the wind turbine to a controller of the wind turbine.

Another embodiment of the invention provides a wind turbine comprising a device configured to detect radiation reflected from a plurality of predefined positions, determine a property of wind at each position based on the detected radiation, determine a property of wind approaching the wind turbine based on the determined property of wind of at least two positions, and transfer the determined property of wind approaching the wind turbine to a controller of the wind turbine.

Yet another embodiment of the invention is a method using the remote sensing device to provide the wind turbine controller with a property of the wind (e.g. speed or direction) at a specified time or distance ahead of the rotor. The method combines a property of the wind measured at a plurality of locations ahead of the rotor, and maps it to a specified time ahead of the rotor. The turbine controller will then use this information to optimize energy capture or reduce loading on turbine components.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

In general, it is desirable for a wind turbine to have advance knowledge about the properties of the wind which will shortly arrive at the turbine. Such knowledge gives the turbine controller sufficient time to adjust operating parameters, such as blade pitch angle or rotor speed, to match the oncoming conditions. This may be done for a variety of reasons. At lower wind speeds it may be important to maximize the energy that can be extracted by the wind by setting parameters such as blade pitch angle to an optimum position. On the other hand, at higher wind speeds it is important to adjust turbine parameters to avoid operation under conditions which might lead to damage. For example, wind turbines typically have a predefined rated power. When this power output is exceeded, the blade pitch angle and other operating parameters may be adjusted to reduce the amount of energy that is extracted from the wind. Wind turbines also need to be designed to withstand extreme operating conditions, for example those defined in IEC 61400-1:2005. Typically, these extreme conditions are rare single events or a small number of cumulative events which cause large, often unbalanced, loads on the wind turbine and will damage the turbine or reduce the overall lifetime of the turbine components, such as the blades or the gearbox by a significant amount.

Figure 1:
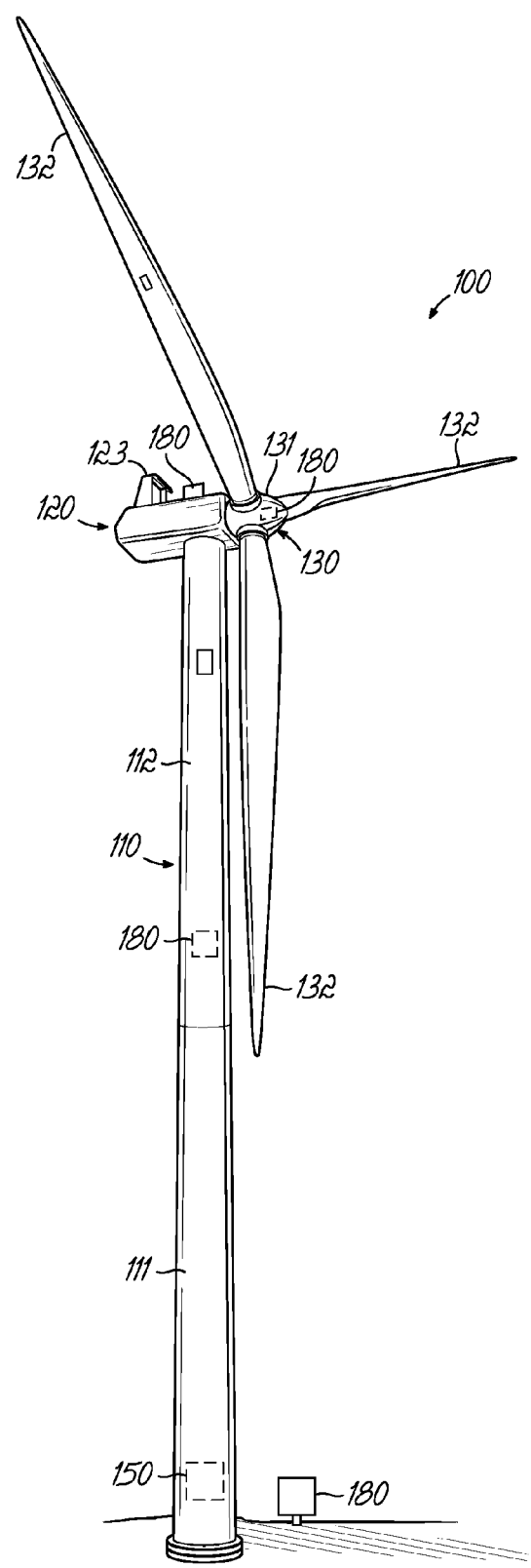
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may use the speed and/or direction of the wind to control the blade pitch angle. Wind speed data may be used to determine an appropriate pitch angle that allows the blades 132 to capture a desired amount of energy from the wind or to avoid excessive loads on turbine components. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100 or to avoid damage to components of the wind turbine.

In one embodiment of the invention, a light detection and ranging (LIDAR) device 180 may be provided on or near the wind turbine 100. For example, the LIDAR 180 may be placed on a nacelle, hub, and/or tower of the wind turbine, as illustrated in FIG. 1. In alternative embodiments, the LIDAR 180 may be placed in one or more blades 132 of the wind turbine 100. In some other embodiments, the LIDAR device may be placed near the wind turbine 100, for example, on the ground as shown in FIG. 1. In general, the LIDAR 180 may be configured to detect wind speed and/or direction at one or more points in front of the wind turbine 100. In other words, the LIDAR 180 may allow the wind turbine to detect wind speed before the wind actually reaches the wind turbine. This may allow wind turbine 100 to proactively adjust one or more of blade pitch angle, generator torque, yaw position, and like operational parameters to capture greater energy from the wind, reduce loads on turbine components, and the like. In some embodiments, a controller may be configured to combine the data received from a LIDAR device 180 and the wind sensor 123 to generate a more accurate measure of wind speed and/or direction.

Figure 2:
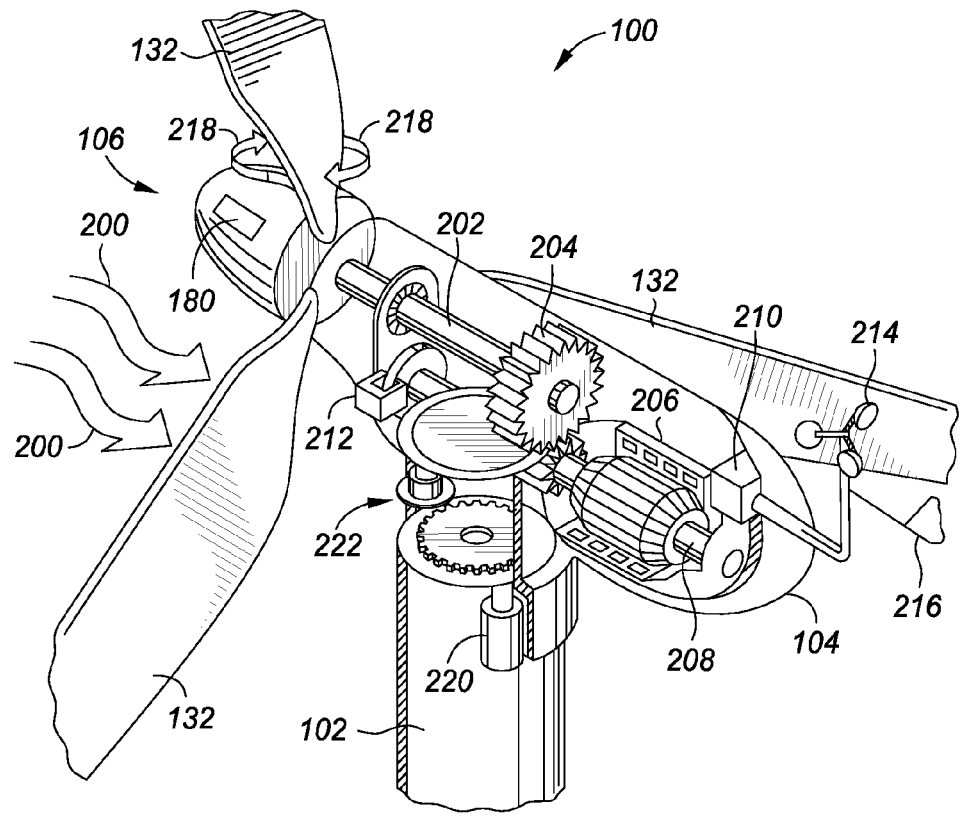
FIG. 2 illustrates a more detailed view of components of an exemplary wind turbine according to an embodiment of the invention.

FIG. 2 illustrates a diagrammatic view of typical components internal to the nacelle 120 and tower 110 of a wind turbine generator 100. When the wind 200 pushes on the blades 132, the rotor 130 spins, thereby rotating a low-speed shaft 202. Gears in a gearbox 204 mechanically convert the low rotational speed of the low-speed shaft 202 into a relatively high rotational speed of a high-speed shaft 208 suitable for generating electricity using a generator 206. In an alternative embodiment, the gear box may be omitted, and a single shaft, e.g., the shaft 202 may be directly coupled with the generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106, in turn. The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 132 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind or downwind (if its as downwind turbine).

The generator 206 may be configured to generate a three phase alternating current based on one or more grid requirements. In one embodiment, the generator 206 may be a synchronous generator. Synchronous generators may be configured to operate at a constant speed, and may be directly connected to the grid. In some embodiments, the generator 206 may be a permanent magnet generator. In alternative embodiments, the generator 206 may be an asynchronous generator, also sometimes known as an induction generator. Induction generators may or may not be directly connected to the grid. For example, in some embodiments, the generator 206 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

Figure 3:
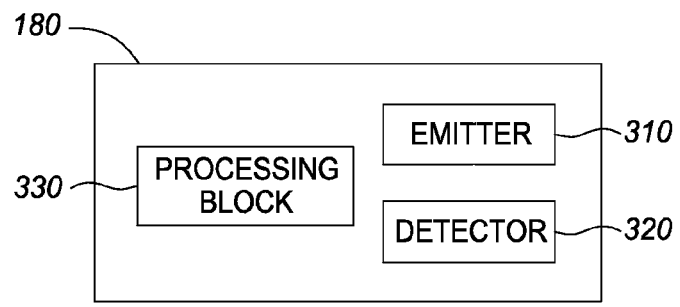
FIG. 3 illustrates a light detection and ranging device according to an embodiment of the invention.

FIG. 2 also illustrates an exemplary hub mounted LIDAR 180 according to an embodiment of the invention. While shown on the hub in FIG. 2, in alternative embodiments, the LIDAR device 180 may be placed on or near any location of the turbine, e.g., on the ground, in the blades, on the nacelle, on the tower, and the like. FIG. 3 illustrates an exemplary view of components within a LIDAR 180 according to an embodiment of the invention. As illustrated, LIDAR 180 may include an emitter 310, a detector 320, and a processing block 330. The term 'processing logic' is used herein with reference to any combination of one or more of the emitter 310, detector 320, and the processing block 330. While a single emitter detector pair 310-320 are shown in FIG. 3, in alternative embodiments, the LIDAR 180 may include a any number of emitters and/or detectors, In one embodiment of the invention, an emitter-detector may be capable of performing a scanning operation to measure wind properties at a plurality of points.

The emitter 310 may be configured to generate a light beam. For example, in one embodiment, LIDAR 180 may be configured to emit an ultra violet, visible, near infra-red and/or infra-red light beam. The detector 320 may be configured to detect backscattering of the light beam emitted by the emitter from one or more objects. The processing block 330 may be configured to determine one or more properties of the backscattered light detected by detector 320 and determine one or more properties of the one or more objects from which the light beam is reflected.

As stated previously, the LIDAR 180 may be used to measure wind speed and/or direction at a remote location. Knowledge about the wind speed and direction at a remote location, e.g., in front of a rotor of a wind turbine, may allow the wind turbine to optimize one or more operational parameters such as blade pitch angle and/or generator torque to reduce loads on wind turbine components and/or increase energy capture.

To measure the wind speed remotely, a light beam (e.g., a Laser beam) may be emitted into oncoming wind by, for example, emitter 310 of the LIDAR 180. The emitted light may reflect off of aerosols (e.g., pollen, dust) in the wind and may be scattered in multiple directions. A portion of the scattered light may travel back to the LIDAR 180, and may be detected by, e.g., the detector 320 of LIDAR 180. Based on the backscattered light, one or more properties of the aerosols may be determined by the processing block 330. For example, the processing block 330 may use the Doppler Effect to determine properties of the aerosols. Because the properties of the aerosols strongly correlate with the property of the wind carrying the aerosols, properties of the wind, e.g. wind speed and direction, may be determined based on the properties of the aerosols.

In one embodiment of the invention, the emitter 310 may be configured to generate pulsed radiation. In other words, the emitter 310 may be configured to generate short bursts of radiation. In one embodiment, one or more properties of the radiation may differ from burst to burst. Pulsed radiation may allow the LIDAR 180 to determine properties of aerosols at multiple remote locations, thereby facilitating a more accurate estimation of properties of the oncoming wind.

Figure 4:
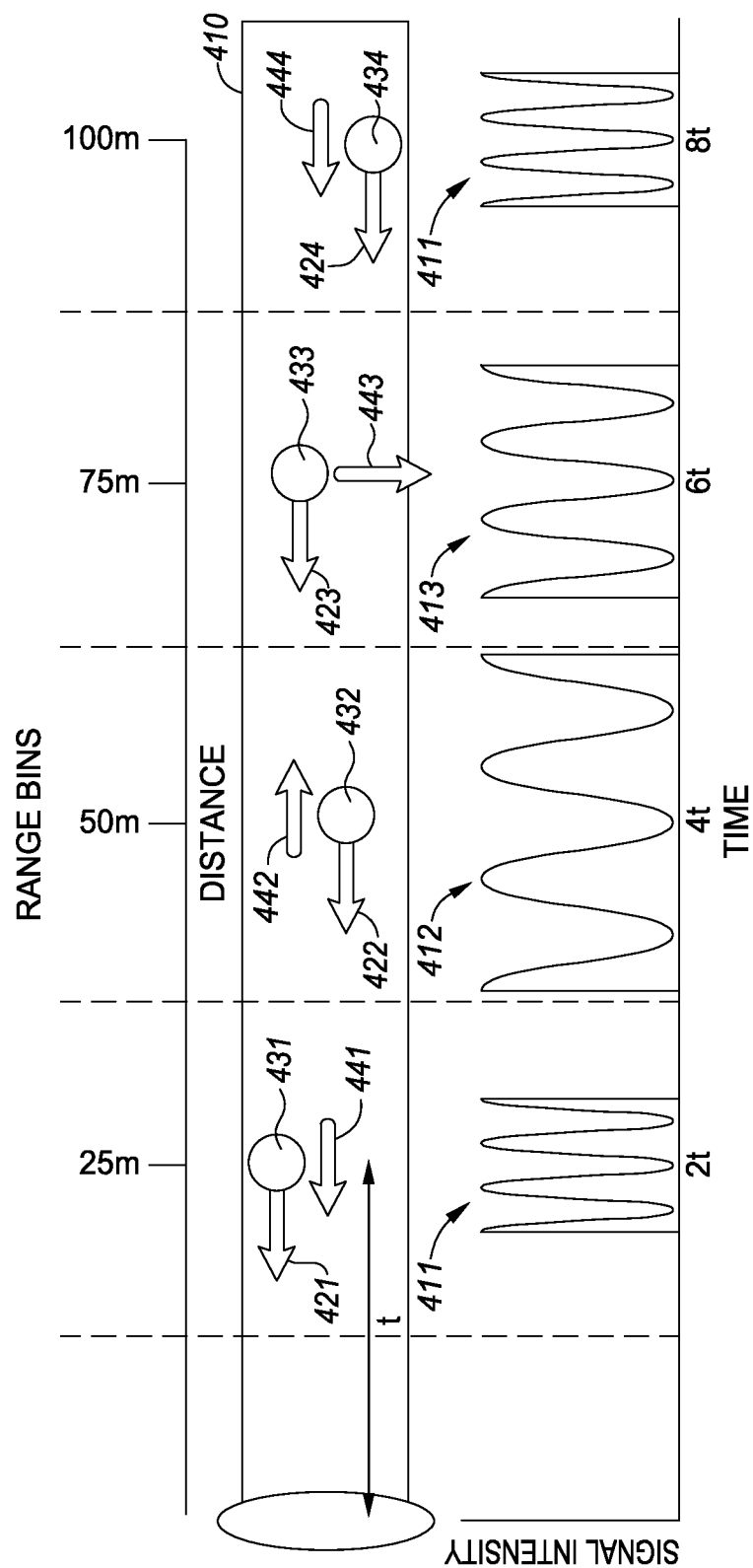
FIG. 4 illustrates pulsed radiation according to an embodiment of the invention.

FIG. 4 diagrammatically illustrates operation of a pulsed LIDAR system according to an embodiment of the invention. As shown, pulsed radiation 410 may be emitted by the LIDAR 180 into oncoming wind. In one embodiment, the radiation 410 may include short bursts of radiation of different intensity. The pulsed radiation may be used to measure properties of the wind at multiple distances, e.g., at 25 m, 50 m, 75 m, and 100 m as shown in FIG. 4. Each of the multiple distances at which the wind properties are measured is referred to herein as a range gate. For example, FIG. 4 illustrates 4 range gates.

While variation of the intensity of radiation/light is disclosed hereinabove, in alternative embodiments, any other property of the light, e.g., the size of the pulse, shape of the pulse, length of the pulse, or the like, may be varied from burst to burst. In another embodiment, instead of using pulsed radiation, the LIDAR 180 may include a plurality of emitter detector pairs, wherein each emitter detector pair is associated with a particular range gate. Each of the emitter detector pairs may emit and detect unique type of radiation, e.g., radiation of a particular intensity, thereby allowing the emitter detector pair to sense the properties of wind at the associated range gate.

FIG. 4 assumes that it takes time t for the radiation to travel a distance of 25 m. Accordingly, to measure the wind properties at each of the predefined distances, the detector measures the change in frequency of the radiation as it interacts with the aerosols in the air. For example, at 25 m the aerosol particle is moving towards the light source, which causes the frequency of the reflected light 411 to be greater. This change in the light properties may be utilized to measure the properties of the wind at 25 m. Similarly, pulse of light 412 may be utilized to measure the properties of the wind at 50 m, a third pulse of light 413 may be utilized to measure the properties of the wind at 75 m. And finally a fourth pulse of light 411 may be utilized to measure the properties of the wind at 100 m.

As further illustrated in FIG. 4, at least a portion of the pulsed radiation may be reflected back towards the LIDAR 180 by aerosols in the wind. For example, an aerosol particle 431 at a distance of 25 m from the LIDAR 180 may reflect a portion 421 of the pulsed radiation back to the LIDAR 180. Similarly the particles 432, 433, and 434 are shown reflecting portions of the pulsed radiation 422, 423, and 424, respectively from distances 50 m, 75 m, and 100 m, back towards the LIDAR 180. While only a single aerosol particle is shown at each of distances 25 m, 50 m, 75 m, and 100 m for purposes of simplicity, one skilled in the art will recognize that a plurality of aerosol particles may exist at each predefined distance from the LIDAR 180, and that each particle may backscatter a portion of the pulsed radiation to the LIDAR 180.

In one embodiment of the invention, the backscattered portions of the pulsed radiation 421-424 may be received by the detector 320 at times $2t$, $4t$, $6t$, and $8t$, respectively. The processing block 330 (See FIG. 3) may analyze the detected backscattered radiation to determine one or more properties of the aerosol particles 431-434. For example, the processing block 330 may utilize the Doppler Effect to determine the speed of the aerosol particles 431-434 in the direction of the laser.

It is possible that the aerosol particles at different locations may have different speeds and direction. For example, aerosol particle 431 is shown moving in a first direction 441, aerosol particle 432 is shown moving in a second direction 442, aerosol particle 433 is shown moving in a third direction 443, and aerosol particle 434 is shown moving in a fourth direction 444. Because aerosol particles may be moving at different speeds and directions at different distances, the particles at one particular location alone may not provide an accurate indication of properties of the wind that is moving towards the wind turbine. Embodiments of the invention provide a LIDAR 180 capable of measuring properties of the wind at a plurality of locations and determining a more accurate indication of the properties of wind that will reach the turbine.

While FIG. 4 illustrates measuring properties of the wind at multiple different points that are at different distances from the wind turbine rotor, in alternative embodiments, the multiple different points of measurement may be the same distance from the wind turbine rotor. For example, in one embodiment, a scanning LIDAR device may be used to measure wind properties at multiple points that are a predefined distance from the wind turbine rotor. In one embodiment, a combination of measurements at multiple locations, some of which may be different distances, and some of which may be the same distance from the wind turbine rotor may be used to estimate the property of oncoming wind.

Figure 5:
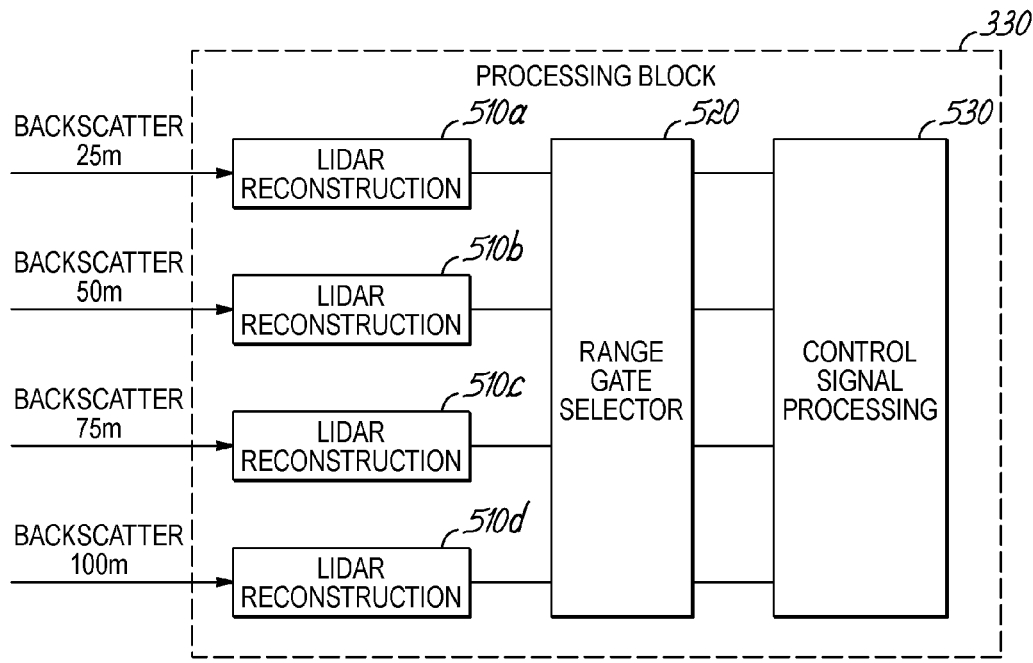
FIG. 5 illustrates processing logic according to an embodiment of the invention.

FIG. 5 illustrates a more detailed view of the processing block 330 according to an embodiment of the invention. The processing block 330 may be implemented as hardware, software, or a combination of hardware and software. While shown as a part of the LIDAR device 180, in alternative embodiments, the processing block may be implemented outside the LIDAR device 180, for example, in the wind turbine controller 210 (see FIG. 2).

As illustrated in FIG. 5 the processing block 330 may include a plurality of LIDAR reconstruction blocks 510 (four blocks 510*a*-*d* shown), a range gate selector 520, and a control signal processing block 530. Each of the LIDAR reconstruction blocks 510 may be configured to determine one or more properties of the wind at a remote location. In one embodiment, each LIDAR reconstruction block 510 may correspond to a respective range gate. For example, LIDAR reconstruction block 510*a*, 510*b*, 510*c*, and 510*d* of FIG. 5, may correspond to the range gates 25 m, 50 m, 75 m, and 100 m respectively in FIG. 4.

In one embodiment, each of the LIDAR reconstruction blocks 510 may determine a line of sight velocity of the aerosols associated with their respective range gate based on the reflected beam. The line of sight velocity may refer to the velocity of the wind in a direction along the direction of the pulsed radiation. The line of sight velocities may be transferred to a separate controller, e.g., the controller 210, which may compute one or more of the axial wind speed, lateral wind speed, absolute wind speed, and/or the wind direction. The axial wind speed may refer to the wind speed in a direction that is perpendicular to the rotor plane (out of plane), and the lateral wind speed may refer to the wind speed in a direction that is parallel to the rotor plane (in plane).

In one embodiment of the invention, each LIDAR reconstruction block 510 may be configured to perform coherence filtering to remove any noise from undesirable sources in the detected radiation for a particular range gate. Noise in the radiation may be introduced via other sources of radiation, reflections from one or more previous or subsequent pulses of radiation of different intensity, and the like. Furthermore, different frequencies in the wind may be coherent at different distances. For example, high frequencies at distances at or near 200 m from the wind turbine rotor may not be expected to reach the rotor. Accordingly, such high frequencies may be filtered out.

In some instances it may be possible that there are no aerosols (or a very few aerosols) exist at or near a particular range gate. Accordingly, the LIDAR reconstruction block 510 associated with that particular range gate may not detect adequate backscattered radiation. In some embodiments, the LIDAR 180 may be placed on a nacelle of a wind turbine. Accordingly, the moving blades of the wind turbine may block the emitted radiation from reaching the range gate. In some other embodiments, after performing the coherent filtering, the LIDAR reconstruction block 510 may determine that the detected radiation is not reliable for calculating properties of the wind for the respective range gate.

In such instances, the LIDAR reconstruction block 510 may be configured to generate a signal indicating that data related to that range gate is not valid or not reliable. For example, if reflected radiation is not detected within a predefined period of time from the time of emission of radiation, the LIDAR reconstruction block 510 may be configured to generate a signal indicating that data for the range gate associated with the LIDAR reconstruction block 510 is not reliable.

As illustrated in FIG. 5, the LIDAR reconstruction blocks 510 may be coupled with the range gate selector 520. In one embodiment, the LIDAR reconstruction blocks 510 may be configured to transfer one or more signals to the range gate selector 520. For example, each LIDAR reconstruction block 510 may transfer data related to one or more of axial, lateral, vertical, absolute wind speed, and/or wind direction for a respective range gate to the range gate selector 520. In some embodiments, when the data for a particular range gate is determined to be unreliable (due to, for example, lack of backscattering particles), the LIDAR reconstruction block 510 for that range gate may transfer a signal indicating that the data for the range gate is not reliable.

The range gate selector 520 may receive signals from each of the LIDAR reconstruction blocks 510 and transfer only valid data to the control signal processing block 530. For example, if LIDAR reconstruction block 510*a* indicates that data from that block is not reliable, then the range gate selector 520 may not transfer data from the LIDAR reconstruction block 510*a* to the control signal processing block 530.

The control signal processing block 530 may be configured to combine the data received from two or more LIDAR reconstruction blocks 510 (via the range gate selector 520), and determine an estimated wind speed and/or direction for wind that will approach the wind turbine rotor. For example, in one embodiment, the control signal processing block may simply average the valid data received from a plurality of LIDAR reconstruction blocks 510 to determine the estimated wind speed and/or direction. In an alternative embodiment, the control processing block may use a root mean squared average on the valid data received from a plurality of LIDAR reconstruction blocks 510 to determine the estimated wind speed and/or direction. In an alternative embodiment, the control signal processing block 530 may be configured to determine a weighted average of the data received from the LIDAR reconstruction blocks 510. For example, in a particular embodiment, range gates closer to the turbine may have a greater weight than range gates that are further away from the turbine.

In one embodiment of the invention, the estimated properties of wind expected to approach the wind turbine may be provided (by the control signal processing block 530) to one or more controllers of the wind turbine. For example, in one embodiment, the estimated wind speed of wind approaching the wind turbine may be provided to a turbine pitch controller. The turbine pitch controller may adjust a pitch angle of the wind turbine blades based on the received estimated wind speed to maximize energy production, reduce loads on wind turbine components, or the like. In another embodiment, an estimated wind direction calculated by the control signal processing block 530 may be provided to a yaw controller of the wind turbine. The yaw controller may adjust a yaw position of the wind turbine based on the received estimated wind position to ensure that the wind turbine is facing upwind. While a pitch controller and a yaw controller are referenced herein, in alternative embodiment, the estimated wind properties may be transferred to any controller of the wind turbine, e.g., a rotor speed controller.

Figure 6:
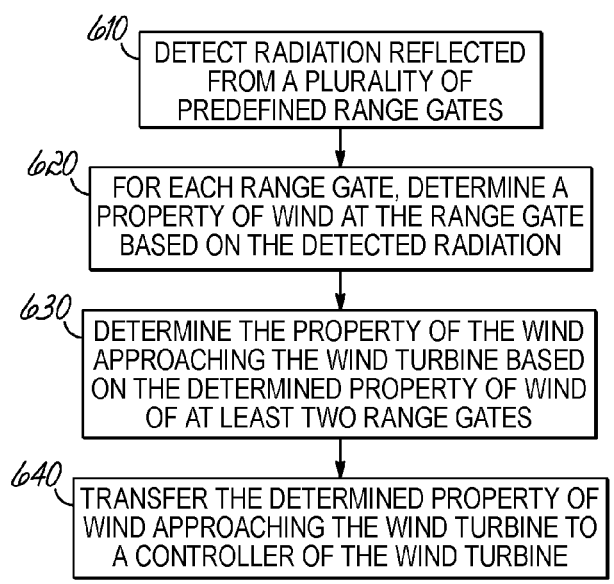
FIG. 6 is a flow diagram of an exemplary method for determining a property of wind approaching a wind turbine, according to an embodiment of the invention.

FIG. 6 is a flow diagram of exemplary operations performed to determine a property of wind approaching a wind turbine, according to an embodiment of the invention. The operations may begin in step 610 by detecting radiation reflected from a plurality of predefined range gates. For example, referring to FIGS. 4 and 5, LIDAR reconstruction blocks 510 may detect reflected radiation from a plurality of range gates. In step 620, a property of wind may be determined for each range gate based on the detected radiation. As described above, the LIDAR reconstruction blocks 510 may determine one or more of an absolute wind speed, lateral wind speed, vertical wind direction axial wind speed, wind direction, or the like for respective range gates. In step 630, the property of the wind approaching the wind turbine may be determined based on the determined property of wind of at least two range gates. Then, in step 640, the determined property of wind approaching the wind turbine may be transferred to a controller of the wind turbine, e.g., a pitch controller, rotor speed controller, yaw controller, or the like.

In another embodiment of the invention the measured wind properties from the remote sensing device, which were measured at a plurality of locations ahead of the rotor, are mapped to a time/distance ahead of the WTG and then combined in the WTG's controller. The turbine controller will then use this information to optimize energy capture or reduce loading on turbine components. This could be achieved by calculating the phase lead for each measurement distance, and then offsetting the measured signals by this amount, when the signals are combined. The phase offset will be continually updated during operation. It could also be advantageous to provide different weightings to the properties of the wind measured by the remote sensor, depending on the wind speed, direction and the distance from the rotor.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for determining a wind property of a wind approaching a wind turbine, comprising:
    emitting, with at least one emitter, radiation to a plurality of distinct positions, wherein the radiation is emitted with predefined distinct values of a predefined radiation property for each of the plurality of distinct positions, and the predefined radiation property comprises at least one of: an intensity, a pulse length, a pulse shape, a pulse frequency, and a pulse size, wherein the plurality of distinct positions include either multiple positions in a rotor plane or multiple range gates;
    detecting, with at least one detector, the radiation backscattered by aerosol particles in the wind disposed at the plurality of distinct positions, wherein the detecting radiation backscattered from the plurality of distinct positions comprises detecting the backscattered radiation based on the predefined distinct values of the radiation property for each of the plurality of distinct positions;
    determining, with a processor, a wind property for each of the plurality of distinct positions based on the detected radiation;
    determining, with the processor, the wind property of the wind approaching the wind turbine based on the wind property of wind determined for at least two of the plurality of distinct positions; and
    transferring, with the processor, the determined wind property of the wind approaching the wind turbine to a controller of the wind turbine.

2. The method of claim 1, wherein the wind property determined for each of the plurality of distinct positions comprises at least one of: an absolute wind speed; a lateral wind speed; an axial wind speed; a vertical wind speed; a line of sight wind speed; and a wind direction.

3. The method of claim 1, further comprising:
    determining whether values of the wind property determined for each of the plurality of distinct positions are reliable; and
    determining the property of wind approaching the wind turbine based on positions where the property of wind is determined to be reliable.

4. The method of claim 1, wherein determining the wind property for each of the plurality of distinct positions comprises performing coherence filtering of the detected radiation to remove noise.

5. The method of claim 1, wherein determining the wind property of the wind approaching the wind turbine comprises computing an average of the wind property determined for at least two of the plurality of distinct positions.

6. The method of claim 5, wherein the average is a weighted average, wherein some of the at least two of the plurality of distinct positions are given a greater weighting than others of the at least two of the plurality of distinct positions.

7. The method of claim 1, wherein the wind property of the wind approaching the wind turbine that is determined is one of: wind speed and wind direction.

8. A device, comprising:
a plurality of reconstruction blocks configured to determine values of a wind property for a plurality of predefined positions based on radiation backscattered from the plurality of predefined positions and detected at a radiation detector, and the plurality of reconstruction blocks further configured to identify whether the values are at least one of reliable and unreliable; and
a control signal processor configured to determine the wind property of wind approaching a wind turbine based on the determined wind property associated with at least two of the plurality of predefined positions and the values identified to be reliable, wherein values identified to be unreliable are excluded when determining the wind property of wind approaching the wind turbine,
wherein the control signal processor is further configured to determine the wind property of the wind approaching the wind turbine by computing a weighted average of values of the wind property determined for at least two of the plurality of predefined positions, and wherein weights assigned to the values are based on a proximity of the at least two of the plurality of predefined positions relative to the wind turbine, and the control signal processor is further configured to transfer the determined property of wind approaching the wind turbine to a controller of the wind turbine.

9. The device of claim 8, wherein the wind property determined for each of the plurality of predefined positions comprises at least one of: an absolute wind speed; a lateral wind speed; an axial wind speed; a line of sight wind speed; and a wind direction.

10. The device of claim 8, wherein at least one of the plurality of reconstruction block is further configured to perform coherence filtering of the detected radiation to remove noise when determining the wind property for the plurality of predefined positions.

11. The device of claim 8, wherein the weights assigned to some of the values are greater than for others of the values.

12. A wind turbine comprising a device comprising:
a detector configured to detect radiation backscattered from a plurality of predefined positions;
at least one reconstruction block configured to determine a wind property for the plurality of predefined positions based on the radiation detected at the detector; and
a control signal processor configured to determine the wind property of wind approaching the wind turbine by computing an average, wherein the average is computed using values of the determined wind property based on at least two of the plurality of predefined positions,
wherein the control signal processor is further configured to transfer the determined wind property of wind approaching the wind turbine to a controller of the wind turbine.

13. The wind turbine of claim 12, wherein the wind property determined for each of the plurality of predefined positions comprises at least one of: an absolute wind speed; a lateral wind speed; an axial wind speed; a line of sight wind speed; and a wind direction.

14. The wind turbine of claim 12, wherein the at least one reconstruction block is further configured to determine whether values of the wind property determined for the plurality of predefined positions are reliable; and
wherein the control signal processor is further configured to determine the wind property of the wind approaching the wind turbine based on respective ones of the plurality of predefined positions where the values of the property of wind are determined to be reliable.

15. The wind turbine of claim 12, wherein the at least one reconstruction block is further configured to perform coherence filtering of the detected radiation to remove noise when determining the wind property for the plurality of predefined positions.

16. The wind turbine of claim 12, wherein the control signal processor is further configured to determine the wind property of the wind approaching the wind turbine by computing a root mean square average of values of the wind property determined for at least two of the plurality of predefined positions.

17. The wind turbine of claim 12, wherein the average is a weighted average, and wherein weights assigned to the values are based on a proximity of the at least two of the plurality of predefined positions relative to the wind turbine.

* * * * *